United States Patent [19]

Bauer et al.

[11] 4,119,595

[45] Oct. 10, 1978

[54] LOW-TEMPERATURE EPOXY BAKING COMPOSITIONS

[75] Inventors: Ronald S. Bauer; John A. Lopez, both of Houston, Tex.

[73] Assignee: Shell Oil Company, Houston, Tex.

[21] Appl. No.: 777,984

[22] Filed: Mar. 16, 1977

[51] Int. Cl.² .................................................. C09D 3/52
[52] U.S. Cl. .................................. 260/21; 260/18 EP
[58] Field of Search ........................... 260/18 EP, 21

[56] References Cited

U.S. PATENT DOCUMENTS

| | | | |
|---|---|---|---|
| 2,633,458 | 3/1953 | Shokal | 260/2 EP |
| 2,940,986 | 6/1960 | Newey | 260/18 EP |
| 3,280,056 | 10/1966 | Masters | 260/21 |
| 3,336,241 | 8/1967 | Shokal | 260/2 A |
| 3,356,624 | 12/1967 | Neal et al. | 260/18 EP |
| 3,408,219 | 10/1968 | Neal et al. | 260/18 EP |
| 3,412,055 | 11/1968 | Koral | 260/21 |
| 3,446,762 | 5/1969 | Lopez et al. | 260/18 EP |
| 3,738,862 | 6/1973 | Klarquist et al. | 260/47 EN |
| 3,772,228 | 11/1973 | Allen | 260/21 |
| 4,017,432 | 4/1977 | Carey | 260/18 EP |

FOREIGN PATENT DOCUMENTS 569,227   1/1959   Canada ............................ 260/18 EP

*Primary Examiner*—Ronald W. Griffin
*Attorney, Agent, or Firm*—Norris E. Faringer

[57] ABSTRACT

Stable, high-solids, low-temperature baking compositions are prepared by first reacting an epoxy resin with a polymeric fatty acid, and then reacting the resulting condensate with more than 2% by weight of a strong acid, and adding a curing amount of an amino-containing resin.

13 Claims, No Drawings

LOW-TEMPERATURE EPOXY BAKING COMPOSITIONS

BACKGROUND OF THE INVENTION

The preparation of epoxy esters of polymerized fatty acids by conventional processes is well-known. See, for example, U.S. Pat. No. 2,940,986.

The preparation of condensation products of epoxy resins and dimer acids is described in U.S. Pat. No. 3,356,624, U.S. Pat. No. 3,408,219, and U.S. Pat. No. 3,446,762. These adducts were utilized in a traffic paint formulation wherein no curing agent is utilized; however, a considerable amount of organic solvent is required. Environmental control regulations are becoming more and more stringent, therefore, it is very desirable to prepare high solids, low-solvent coating systems. Higher solids epoxy/dimer acid adducts can be prepared by adjusting the ratio of epoxy resin to dimer acid; however, a higher than commercially desirable baking temperatures is now generally required.

The use of small amounts, i.e., less than 1%, and generally less than 0.5%, of an acid such as para-toluene sulfonic acid, to catalyze the curing of epoxy-dimer acid adducts is known; however, these systems do not have good storage stability and high baking temperatures are required to produce an acceptable coating. It would therefore be a considerable improvement if a single package system could be prepared which is not only stable, but can be cured at low temperatures, i.e. less than about 85° C.

It has now been discovered that a stable, high solids, low-temperature curing epoxy baking enamel can be prepared by first preparing a high solids (80%w or above) adduct of an epoxy resin and a polymerized fatty acid; then reacting this adduct with a strong acid such as para-toluene sulfonic acid, sulfuric acid, hydrochloric acid and phosphoric acid; and finally mixing or adding an amino-plast curing resin, preferably, a high solid, liquid amino-plast resin such as an amino-formaldehyde; i.e. melamine-formaldehyde or urea-formaldehyde resin.

The resulting one-package system is stable and cures at temperatures below about 85° C. to produce coatings exhibiting excellent physical properties.

SUMMARY OF THE INVENTION

The present invention is directed to stable, high-solids, low-temperature baking compositions. More particularly, the present invention is directed to a low-temperature, heat-curable, single package epoxy baking enamel comprising (1) an adduct of (a) an epoxy resin and (b) a polymerized fatty acid, (2) an amino-plast resin and (3) greater than 2% by weight based on the adduct of a strong acid catalyst such as phosphoric acid.

DESCRIPTION OF THE PREFERRED EMBODIMENT

In general, the present compositions are obtained by first preparing an epoxy resin-polymeric fatty acid adduct by reacting an epoxy resin with a dimer acid, trimer acid, or a mixture thereof, generally, in the presence of a suitable esterification catalyst. The resulting adduct is then mixed with phosphoric acid and the resulting mixture, after a suitable pre-reaction or "sweat-in" time is mixed with an amino-plast resin. The resulting composition is a stable, one-package, composition which can be cured (baked) at temperatures below 200° C. to produce excellent primer and coating compositions.

PREPARATION OF EPOXY-POLYMERIC FATTY ACID ADDUCTS

EPOXY COMPOUNDS

The epoxy compounds which may be used are those possessing at least one 1,2-epoxide group, i.e., a

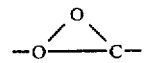

group. They may be monoepoxides or polyepoxides. The monoepoxides may be aliphatic or cycloaliphatic or heterocyclic and may be saturated or unsaturated. They may also be substituted with aromatic rings, ether groups, halogen atoms, ester groups, and the like. Examples of the monoepoxides include, among others, styrene oxide, phenyl glycidyl ether, allyl glycidyl ether, octadecyl glycidyl ether, amyl glycidyl ether, chlorophenyl glycidyl ether, naphthyl glycidyl ether, 1,2-hexylene oxide, ethylene oxide, propylene oxide, 1-heptylene oxide, 3-ethyl-1,2-pentylene oxide, glycidyl acetate, glycidyl benzoate, glycidyl propionate, glycidyl acrylate, glycidyl allyl phthalate, glycidyl methyl maleate, glycidyl stearate, glycidyl oleate, methyl 1,2-epoxy propionate, butyl 1,2-epoxy propionate, and the like.

The polyepoxides used in the process of the invention comprise those compounds possessing more than one 1,2-epoxide group. These polyepoxides may be saturated or unsaturated, aliphatic, cycloaliphatic, aromatic or heterocyclic and may be substituted if desired with noninterfering substituents, such as halogen atoms, phosphorus atoms, hydroxyl groups, ether radicals, and the like. They may also be monomeric or polymeric.

For clarity, many of the polyepoxides and particularly those of the polymeric type are described in terms of epoxy equivalent values. The meaning of this expression is described in U.S. Pat. No. 3,633,458. The polyepoxides used in the present process are those having an epoxy equivalency greater than 1.0.

Various examples of polyepoxides that may be used in the invention are given in U.S. Pat. No. 2,633,458 and it is to be understood that so much of the disclosure of that patent relative to examples of polyepoxides is incorporated by reference into this specification.

Other suitable mono and polyepoxides, including ethers and esters are disclosed in U.S. Pat. No. 3,738,862, and so much of the disclosure of that patent relevant to examples of epoxy compounds is incorporated by reference into this specification.

Other suitable polyepoxides are disclosed in U.S. Pat. No. 3,356,624, U.S. Pat. No. 3,408,219, and U.S. Pat. No. 3,446,762, and so much of the disclosure relevant to examples of epoxy compounds is incorporated by reference into this specification.

Other suitable epoxy compounds include those compounds derived from polyhydric phenols and having at least one vicinal epoxy group wherein the carbon-to-carbon bonds within the six- membered ring are saturated. Such epoxy resins may be obtained by at least two well-known techniques, i.e., by the hydrogenation of glycidyl polyethers of polyhydric phenols or (2) by the reaction of hydrogenated polyhydric phenols with epichlohydrin in the presence of a suitable catalyst such as Lewis acids, i.e., boron trihalides and complexes thereof, and subsequent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium and/or ruthenium supported on an inert carrier at a temperature below about 50° C. This method is thoroughly disclosed and described in U.S. Pat. No. 3,336,241, issued Aug. 15, 1967.

The hydrogenated epoxy compounds prepared by the process disclosed in U.S. Pat. No. 3,336,241 are suitable for use in the present compositions. Accordingly, the relevant disclosure of U.S. Pat. No. 3,336,241 is incorporated herein by reference.

The second method comprises the condensation of a hydrogenated polyphenol with an epihalohydrin, such as epichlorohydrin, in the presence of a suitable catalyst such as $BF_3$, followed by dehydrohalogenation in the presence of caustic. When the phenol is Bisphenol A, the resulting saturated epoxy compound is sometimes referred to as "diepoxidized hydrogenated bisphenol A", or more properly as the diglycidyl ether of 2,2-bis(4-cyclohexanol) propane.

In any event, the term "saturated epoxy resin", as used herein shall be deemed to mean the glycidyl ethers of polyhydric phenols wherein the aromatic ring structure of the phenols have been or are saturated.

An idealized structural formula representing the preferred saturated epoxy compounds is as follows:

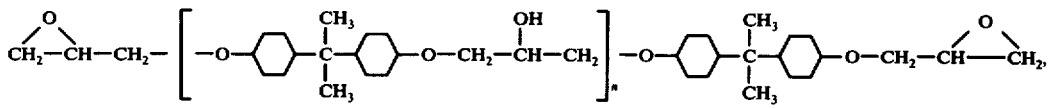

wherein $n$ has a value so that the average molecular weight of the saturated polyepoxide is from about 350 to about 3000.

Preferred saturated epoxy resins are the hydrogenated resins prepared by the process described in U.S. Pat. No. 3,336,241. More preferred are the hydrogenated glycidyl ethers of 2,2-bis(4-hydroxyphenyl)propane, sometimes called the diglycidyl ethers of 2,2-bis(4-cyclohexanol)propane.

POLYMERIC FATTY ACIDS

The polymerized unsaturated and saturated long chain fatty acids suitable for use in the present invention are those obtained by polymerizing unsaturated long chain acids under known conditions such as heat, peroxides and the like. These unsaturated polymeric acids may be subsequently saturated by conventional hydrogenation techniques.

The dimer acids comprise acids obtained by polymerizing unsaturated animal and vegetable fatty acids, such as soya bean oil fatty acids, tallow oil acids, and the like. Particularly preferred are the dimerized acids obtained from the ethylenically unsaturated fatty acids or mixtures thereof derived from semi-drying and drying oils, and particularly the conjugated fatty acids contained at least 12 and generally from about 12 to about 20 carbon atoms, such as 9,11-octadecadienoic acid and other acids within the generic formula

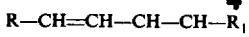

wherein R is a $—R_2COOH$ radical, $R_1$ is either a $—R_2COOH$ group or an alkyl radical and $R_2$ is an alkyl radical. These acids polymerize to form dimer acids of the general formula

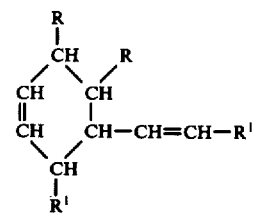

Other suitable dimer acids include those obtained from linoleic acid, linolenic acid, eleosteric acid, and ricinoleic acid. Still another group of dimers are those obtained from dibasic acids such as 8,12-eicosadiene-1,20-dioic acid, 8-vinyl-10-octadecene-1,18-dioic acid, 7,11-octadecadiene-1,18-dioic acid, and the like. As noted hereinbefore, dimer and trimer acids are available commercially sold under various tradenames. A suitable such acid includes Empol 1014, a viscous aliphatic polybasic acid produced by the polymerization of unsaturated fatty acids at mid-molecule and containing 1% $C_{18}$ monobasic fatty acid, 95% $C_{36}$ dibasic fatty acid, and 4% $C_{54}$ tribasic fatty acid, acid value 188–193, saponification value 194–198 and neutralization equivalent 292–298.

Another very suitable dimer acid is marketed as Empol 1016 (dimer acid of less than 1% monobasic acid; neutralization equivalent 284–295; acid value 190–198; and saponification value 194–200).

Particularly preferred are the trimerized acids obtained from the ethylenically unsaturated fatty acids as derived from semi-drying and drying oils, and particularly, the conjugated fatty acids containing from 12 to 20 carbon atoms. The generic structure of the resulting trimerized acids is believed to be that of the following:

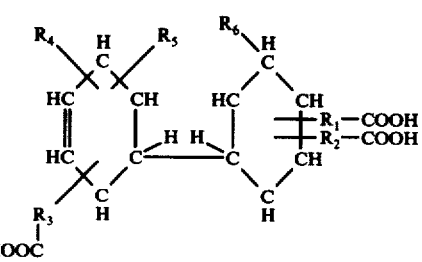

In the above formula, $R_1$, $R_2$ and $R_3$ constitute alkylene radicals having between 4 and 10 carbon atoms each, while $R_4$, $R_5$ and $R_6$ are alkyl radicals having between 4 and 10 carbon atoms each. Normally, the products will have the generic formula as follows.

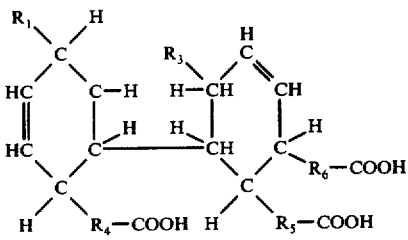

Particularly preferred are the $C_{36}$ dimerized fatty acids.

Other disclosures of suitable polymeric fatty acids can be found in U.S. Pat. No. 3,356,624, U.S. Pat. No. 3,408,219 and U.S. Pat. No. 3,446,762.

ESTERIFICATION CATALYSTS

The present condensation reaction is preferably performed in the presence of a suitable esterification catalyst.

In general, any well-known esterification catalyst may be employed. Very suitable such catalysts include the metal hydroxides, such as sodium hydroxide; tin salts such as stannous octoate; phosphines, such as triphenyl phosphine; -onium salts, such as the phosphonium salts, including the phosphonium halides; ammonium salts, etc.

Particularly good catalysts include the phosphonium halides, e.g. ethyl triphenyl phosphonium iodide, and phosphines such as triphenyl phosphine.

In general, the amount of reactants is critical in order to obtain optimum high solids condensates.

It has been found that when the diepoxides and polymeric fatty acids are reacted in the chemical equivalent ratio of dimer acid to epoxy compound from about 0.1:1.0 to 1.0:1.0, suitable adducts are obtained. The most preferred range is from 0.3 to 0.6 chemical equivalents of polymeric fatty acid per chemical equivalent of epoxy compound.

In general, the catalyst, if employed, is utilized in amounts to effect the desired esterification reaction. A suitable range is from about 0.05% to about 3% by weight of reactants.

Temperatures employed in the reaction will generally vary from about 50° C. to about 275° C. In most cases, the acidic component and the polyepoxide will be quite reactive and temperatures of the order of about 50° C. to 200° C. will be sufficient to effect the desired reaction. In other instances, it may be desirable to use higher temperatures, such as those from 125° C. to 275° C. Temperatures of 300° C. or over should generally not be employed.

The reaction is preferably conducted under atmospheric pressure, but it may be advantageous in some cases to employ subatmospheric or superatmospheric pressures.

The reaction may be conducted in the presence or absence of solvents or diluents. In most cases, the acidic component and polyepoxide will be liquid and the reaction may be easily effected without the addition of solvents or diluents. However, in some cases, whether either or both reactants are solids or viscous liquids it may be desirable to add diluents to assist in effecting the reaction, such as, for example, inert hydrocarbons as xylene, toluene, cyclohexane, and other materials as cyclohexanone, and the like.

If solvents are employed in the reaction and the formed condensate is to be used for coating compositions, the solvent may be retained with the condensate. Otherwise, the solvent should be removed by any suitable method such as vacuum distillation and the like, if the condensate is not to be utilized for some time after its formation.

It has been found that the resulting condensate mixture may preferably contain from about 5% to about 25% by weight of a suitable organic solvent such as ketones (methyl ethyl ketone, methyl isobutyl ketone, etc.); petroleum hydrocarbons (xylene, benzene, mineral spirits, naphthas, etc.); and glycol ethers (OXITOL®, methyl OXITOL®, CELLOSOLVE®, CELLOSOLVE® acetate, etc.).

STRONG ACIDS

Suitable strong acids include the organic acids such as para- toluene sulfonic acid and the mineral acids such as hydrochloric acid, sulfuric acid and phosphoric acid. In general, greater amounts (4 to 8 phr) of the organic acids are required and slightly higher baking temperatures are required to produce an optimum balance of properties. An excellent balance of properties is achieved with phosphoric acid at 3-5 phr (parts per 100 parts of condensate); therefore, phosphoric acid is a preferred acid.

From about 2% to about 10% by weight, based on the weight of the condensate, of the acid, preferably phosphoric acid is added to the condensate and the composition allowed to set for a period. This pre-reaction period or "sweat-in" time is dependent upon the temperature and may vary from a few hours to several days. At elevated temperatures, i.e. 150° to 250° C., an adequate time is about 2–5 hours. A very suitable time is 2–5 days at room temperature.

After the condensate/phosphoric acid mixture has suitably reacted, an amino-plast curing resin is added.

AMINO-PLAST RESINS

Preferred curing agents include the so-called amino resins or amino-plasts containing —$NH_2$ groups derived from urea and melamine. Suitable amino-containing resins are prepared by reacting urea or melamine with formaldehyde under well-known conditions to form a reaction monomer first and then, by condensation polymerization, a large number of varying types of polymeric intermediates are formed. The preparation of urea-formaldehyde and melamine-formaldehyde resins is well-known in the art and forms no part of the present invention. Their use in crosslinking epoxy resins mostly through methylol groups is also well-known. Accordingly, a large number of amino-plast and phenol-plast resins, i.e., urea-formaldehyde and melamine-formaldehyde resins, are commercially available under such trade designations as Plaskon, Beetle, Cymel, Fiberite, Resimene, Curacron and Beckamine, among many others.

Usually, a curing amount of the amino-plast resin is used. A very suitable amount ranges, on a weight ratio of epoxy-dimer acid condensate to amino-plast resin, from about 50:50 to about 95:5.

The resulting composition is a stable, high-solids coating composition which can be cured at temperatures below about 100° C. and usually below 85° C. to produce coatings exhibiting excellent chemical resistance and physical properties.

It will be appreciated that other conventional additives may be added according to the final desired coating. Suitable such additives include, among others, pigments, thioxotropic agents, flow control agents, catalysts, etc.

The present coating compositions may be applied to a suitable substrate by any suitable means such as spraying, dipping, painting, doctor blade, or the like. The thickness of the film will depend on many circumstances, particularly the end-use of such baked coatings, e.g., as primers or as surface coatings.

After the desired film thickness is applied to a suitable substrate, the composition is simply baked at a temperature below 100° C., preferably below 85° C. for sufficient time to cure the coating, generally from about 15 minutes to 1 hour.

The advantages of the instant compositions are illustrated by the following illustrative examples. The reactants, their proportions, and other specific ingredients are presented as typical and various modifications can be made in view of the foregoing disclosure and discussion without departing from the spirit or scope of the disclosure or of the claims. Unless otherwise specified, parts and percentages recited in the Examples are by weight.

EXAMPLE I

This example illustrates the preparation of two epoxypolymeric acid adducts or condensates.

CONDENSATE A

To a kettle were charged, 1000 parts by weight (pbw) of EPON ® Resin 828 [a diglycidyl polyether of 2,2-bis(4-hydroxyphenyl)-propane having an average molecular weight of about 380 and a weight per epoxy (WPE) of about 185-190] and 598 pbw of EMPOL ® Acid 1024 [a polymeric fatty acid derived from $C_{18}$ vegetable acids containing a trace of $C_{18}$ monomeric acid, 25% $C_{36}$ dimer acid, and 75% $C_{54}$ trimer acid; Acid Value of 189-197; Saponification Number of 191-199]. After the mixture was heated to 200° F., 0.11 pbw of triphenyl phosphine (TPP) was added and the mixture heated at 300° F. for 3½ hours. The acid value (measured) of the condensate was zero.

To this condensate were added 178 pbw of methyl isobutyl ketone (MIBK) to give 89.7% by weight non-volatile (NV). Sufficient MIBK was then added to produce 89% NV, which solution had a viscosity at 77° F. of Z-6 + (Gardner-Holdt) and a Gardner Color of 6. This condensate (0.4 equivalents of acid per equivalents of epoxy) will hereinafter be referred to as Condensate A.

CONDENSATE B

The procedure above was essentially repeated wherein 1000 pbw of EPON ® Resin 828 were reacted with 524 pbw of EMPOL ® Acid 1024 in the presence of 0.11 phr of TPP for 3½ hours at 300° F.

Approximately 169 pbw of MIBK were added to the resulting condensate to produce 89% NV. This solution had a Gardner-Holdt viscosity at 77° F. of Z-5 and a Gardner Color of 6.

This condensate (0.35 equivalents of acid per equivalent of epoxy) will be hereinafter referred to as Condensate B.

EXAMPLE II

This example illustrates the stability, as measured by reduced change in viscosity, of the instant high solids coating compositions.

To a mixture of 60 parts by weight of the epoxy-polymeric fatty acid condensate prepared as described in Example I (Condensate A) and 40 parts by weight of an amino-containing resin (CYMEL ® Resin 303) was added 4 parts per hundred parts (phr) of condensate of phosphoric acid as a 10% by weight solution in isopropyl alcohol. After standing three days at ambient temperature, a solution containing 100 parts of the resulting resin was ground on a 3-roll mill with 300 parts of a pigment containing 60 parts by weight barytes, 20 parts by weight iron oxide, 10 parts by weight of clay, and 10 parts by weight of talc. The resulting mixture was reduced to 70% non-volatiles with a solvent blend consisting of 1 part methyl ethyl ketone, 1 part OXITOL ® glycol ether, and 1 part xylene; and the resulting coating solution had a viscosity of 23 seconds (Ford Cup No. 4). After storage at 130° F. for 254 hours, the viscosity had increased to 35 seconds.

The above procedure was essentially repeated wherein the weight ratio of epoxy/acid condensate to amino resin was 70:30 and 80:20.

The above procedure was essentially repeated wherein the amino resin was BECKAMINE ® Resin 21-511 and the weight ratios of epoxy/acid condensate to amino resin was 60:40, 70:30 and 80:20.

The storage stability at 130° F. as measured by viscosity (Ford, No. 4 Cup) is tabulated in Table I.

The data clearly illustrates the stability of the instant high solids coating compositions.

TABLE I

| STORAGE STABILITY AT 130° F | | | | | | |
|---|---|---|---|---|---|---|
| | VISCOSITY - FORD #4, SECONDS | | | | | |
| | CYMEL 303 | | | BECKAMINE 20-511 | | |
| STORAGE TIME, HOURS | 60/40 | 70/30 | 80/20 | 60/40 | 70/30 | 80/20 |
| 0 | 23 | 16 | 20 | 27 | 19 | 20 |
| 16 | 24 | 19 | 25 | 26 | 30 | 54 |
| 60 | — | 20 | 27 | — | 47 | 77 |
| 70 | 28 | — | — | — | — | — |
| 85 | 31 | 20 | 26 | — | 55 | 80 |
| 184 | — | — | — | 25 | — | — |
| 254 | 35 | — | — | — | — | — |

The physical properties of baked coatings prepared from these six pigmented systems are tabulated in Table III and designated as Runs 1-6, inclusively.

EXAMPLE III

This example illustrates the low-temperature bake properties and stability of the instant compositions.

To a mixture of 60 parts by weight of Condensate A from Example I and 40 parts by weight of an amino-containing resin (CYMEL 303) was added 2 phr of phosphoric acid as a 10% solution in isopropanol, and the mixture was allowed to pre-react for 3 days at room temperature.

A 0.2 mil coating (79% solids) was then drawn-down on metal panels and baked at 180° F. (82° C.) for 30 minutes. The baked coating exhibited 30 methyl ethyl ketone (MEK) double rubs. The MEK double rub test is the number of double rubs of gauze saturated with MEK required to soften the baked coating and is a general measure of the degree of cure.

A sample of the coating composition was then evaluated for viscosity change (stability) by measuring the initial viscosity and the viscosity after selected periods of time during storage at room temperature.

The above procedure was essentially repeated at 4 phr of phosphoric acid.

The results of the above experiments is tabulated in Table II.

The data clearly illustrates that the stability of the compositions is markedly improved when 4 phr of phosphoric acid is used in lieu of 2 phr. Also, the MEK resistance is improved at the higher acid catalyst concentration.

TABLE II
PROPERTIES OF COATING COMPOSITIONS & RESULTING BAKED COATINGS

| Amino Resin | Beckamine 21-511 | | Cymel 303 | |
|---|---|---|---|---|
| Coatings Solids | 58% | 65% | 68% | 79% |
| Catalyst, phr | 4 | 2 | 4 | 2 |
| MEK Resistance, Double Rubs | 60 | 30 | 40 | 30 |
| Viscosity, poise | | | | |
| Initial | 4.9 | 6.0 | 5.5 | 9.4 |
| 1 day | 5.0 | 8.5 | 5.5 | 14.4 |
| 2 days | 7.6 | 14.2 | 9.1 | 24.8 |
| 3 days | 11.8 | 22.9 | 14.2 | 39.6 |
| 4 days | — | 33.0 | — | 56.0 |
| 6 days | 18.9 | — | 23.2 | — |
| 7 days | — | 88.0 | — | 116.0 |
| 9 days | — | 155.0 | — | 242.0 |
| 10 days | — | 186.0 | — | 200.0 (?) |
| 14 days | 19.0 | 380.0 | 21.4 | 360.0 |
| 16 days | — | 440.0 | — | 430.0 |
| 18 days | — | 490.6 | — | 530.0 |
| 21 days | — | 560.0 | — | 730.0 |
| 42 days | 9.5 | | 14.3 | |
| 48 days | 9.4 | | 13.9 | |

EXAMPLE IV

The procedures of Example III are essentially repeated wherein 2 and 4 phr of para-toluene sulfonic acid is used in lieu of phosphoric acid. When the panels were baked at 82° C. for 30 minutes, the coating exhibited an MEK double rub of 5 to 10; however, at 4 phr and a higher baking temperature of ca 100° C., the MEK resistance is significantly improved.

EXAMPLE V

The procedures of Example II is essentially repeated using Condensate B. The physical properties of six representative baked coatings prepared from these pigmented systems are tabulated in Table III and designated as Runs 7 to 12, inclusively.

EXAMPLE VI

Related results are obtained when the epoxy-dimer acid condensate is derived from a hydrogenated glycidyl ether of BPA (e.g. hydrogenated EPON ® Resin 828).

EXAMPLE VII

This example illustrates the properties of the present system prepared from a saturated epoxy compound.

The procedures of Example I were essentially repeated wherein 2880 pbw of a saturated epoxy compound (a diglycidyl ether of hydrogenated BPA having an idealized structure noted hereinbefore and having a WPE of 234 and an average molecular weight of 460–470) is reacted with 1244 pbw of EMPOL ® Acid 1024 in the presence of 3.8 pbw TPP for 4 hours at 300° F. The acid to epoxy chemical equivalent ratio was 0.4:1.0.

425 pbw of MIBK was then added to produce a solution of 87.2%w N.V. and a viscosity of 50.4 poise. This condensate solution will be referred to as Condensate C.

A clear coating system was then prepared by mixing 80.3 pbw of Condensate C, 30 pbw of CYMEL ® 303, 40 pbw of a 10% solution of phosphoric acid in isopropanol (IPA). The resulting mixture of 67.7% N.V. was allowed to react for 3 days at room temperature.

One mil coatings were then drawn on Bonderite 100 panels with a doctor blade and then baked at 180° F. for 30 minutes. The resulting baked coating exhibited 80 MEK double rubs.

The initial viscosity of the baking solution after pre-reaction of 3 days at room temperature was 8.3 poise. After storage at 125° F. for 46 hours, the viscosity was 20.3 and after 125° F. for 472 hours, the viscosity was 38 poise.

This data clearly illustrates that the present baking systems are stable and produce good coatings after baking at low temperature.

EXAMPLE VIII

This example illustrates the properties of the present low-bake systems prepared from saturated polymeric fatty acids.

The procedures of Example I were essentially repeated wherein 460 pbw of the saturated epoxy compound of Example VII is reacted with 282.5 pbw of EMPOL ® Acid 1010 in the presence of 0.8 pbw of TPP at 300°–340° F. for 5 hours. EMPOL ® Acid 1010 is a saturated (hydrogenated) polymeric acid having "extremely low unsaturation" and containing 97% $C_{36}$ dimer, 3% $C_{54}$ trimer and nil $C_{18}$ monomer acid marketed by Emery Industries.

The viscosity of the neat adduct was 3540 poise and at 90% N.V. in MIBK had a viscosity of 102 poise.

667 pbw of the resulting adduct, 80 pbw of phosphoric acid (50% solution in butanol) and 110 pbw of butanol were pre-reacted at room temperature for 3 days.

500 pbw of $TiO_2$ pigment and 429 pbw of the pre-reacted condensate (Condensate D) were then ground on a 3-roll mill to produce a pigmented masterbatch.

92.5 pbw of masterbatch, 22.7 pbw of CYMEL ® 370 and 60 pbw of solvent (50/50 xylene and CELLOSOLVE ® Acetate) were mixed, sprayed and applied to metal panels and baked at 250° F. for 30 minutes. The resulting baked coating exhibited a 90% — 60° gloss. The initial pencil hardness was 6H; after soaking in CELLOSOLVE ® Acetate for 15 minutes, 6H; and after 60 minutes, 4H.

It has been found that when the present high solids system is pigmented, the resulting pigmented system has exceptional stability. In general, a wide range of pigment concentration can be used depending on the final use; however, excellent pigmented systems are obtained when the pigment to binder weight ratio is from about 1:1 to 4:1.

TABLE III

PROPERTIES OF LOW-BAKE PIGMENTED COMPOSITIONS

| Run | Condensate | Amino Resin | Ratio Condensate/Amino Resin | Flexibility Mandrel Bend Pass | Flexibility Mandrel Bend Fail | Impact Resistance in-lbs Direct | Impact Resistance in-lbs Reverse |
|---|---|---|---|---|---|---|---|
| 1 | A | $X^5$ | 60/40 | 3/16 | — | 160 | 20 |
| 2 | A | $X^5$ | 70/30 | 1/4 | 3/16 | 90 | 20 |
| 3 | A | $X^5$ | 80/20 | 3/16 | — | 100 | 60 |
| 4 | A | $Y^6$ | 60/40 | 1/4 | 3/16 | — | — |
| 5 | A | $Y^6$ | 70/30 | 3/16 | — | 60 | 30 |
| 6 | A | $Y^6$ | 80/20 | 3/16 | — | 120 | 40 |
| 7 | B | $X^5$ | 60/40 | 3/16 | — | 40 | 10 |
| 8 | B | $X^5$ | 70/30 | 5/16 | 1/4 | 50 | 20 |
| 9 | B | $X^5$ | 80/20 | 1/4 | 3/16 | 70 | 40 |
| 10 | B | $Y^6$ | 60/40 | 3/16 | — | 50 | 30 |
| 11 | B | $Y^6$ | 70/30 | 1/4 | 3/16 | 160 | 90 |
| 12 | B | $Y^6$ | 80/20 | 3/16 | — | 160 | 100 |
| Control[4] | — | — | | 3/16 | — | 160 | 140 |

| Run | Adhesion[1] Primer | Adhesion[1] Topcoat | Salt Spray Resistance[2] 400 hrs Inches Scribe Rusting | Salt Spray Resistance[2] 400 hrs Scribe[3] Blistering | Salt Spray Resistance[2] 400 hrs Blister Rate[3] on Face |
|---|---|---|---|---|---|
| 1 | 10 | 10 | 1/8 | 7MD | 9MD |
| 2 | 10 | 10 | 3/16 | 7MD | 9D |
| 3 | 10 | 10 | 1/8 | 7MD | 9D |
| 4 | 10 | 10 | 1/8 | 5D | 9MD |
| 5 | 10 | 10 | 1/8 | 8F | 9VF |
| 6 | 10 | 10 | 1/8 | 7MD | 9VF |
| 7 | 10 | 10 | 1/8 | 7MD | 8MD/D |
| 8 | 10 | 10 | 1/8 | 6D | 6VD |
| 9 | 10 | 10 | 1/8 | 8F | 8VD |
| 10 | 10 | 10 | 1/8 | 6MD | 7F |
| 11 | 10 | 10 | 1/16 | 6F | 8F |
| 12 | 10 | 10 | 1/16 | 8F | 9F |
| Control[4] | 10 | 10 | 1/8 | 5F | 8D |

[1] 10 = no failure, 0 = complete failure based on 9 squares cut into film with rate number equal to number of squares removed with "610" scotch brand tape.
[2] ASTM B117-73
[3] ASTM D714-56 (reapproved 1970). Blisters 10 = none; VD = very dense; D = dense; MD = medium dense; 0 = very large; M = medium; F = few; VF = very few.
[4] Commercial coating system: primer baked 45'/325° F; topcoat baked 30'/190° F.
[5] Amino Resin - X: BECKAMINE 21-511
[6] Amino Resin - Y: CYMEL 303

What is claimed is:

1. A stable, low-temperature baking composition prepared by the process which comprises:
   1. reacting about 1.0 chemical equivalents of an epoxy resin possessing more than one 1,2-epoxide group with from about 0.1 to about 1.0 chemical equivalents of a polymeric fatty acid,
   2. reacting the resulting condensate with more than 2% by weight based on the condensate of a strong acid selected from the group consisting of para-toluene sulfonic acid, hydrochloric acid, sulfuric acid and phosphoric acid, for a period from about 2 hours to about 5 days at a temperature from about room temperature to about 250° C., and
   3. adding a curing amount of an amino-plast resin.

2. The composition of claim 1 wherein the epoxy resin is a glycidyl polyether of 2,2-bis(4-hydroxyphenyl)propane.

3. The composition of claim 1 wherein the epoxy resin is a hydrogenated glycidyl polyether of 2,2-bis(4-hydroxphenyl)propane.

4. The composition of claim 1 wherein the epoxy resin is a glycidyl polyether prepared by condensing 2,2-bix(4-cyclohexanol)propane with epichlorohydrin.

5. The composition of claim 1 wherein the polymerized fatty acids are derived from fatty acids containing from 12 to 20 carbon atoms.

6. The composition of claim 1 wherein the chemical equivalent ratio is from 0.3:1.0 to 0.6:1.0.

7. The composition of claim 1 wherein an esterification catalyst is employed.

8. The composition of claim 7 wherein the catalyst is triphenyl phosphine.

9. The composition of claim 1 wherein the acid is phosphoric acid.

10. The composition of claim 1 wherein at least one pigment is additionally added.

11. The composition of claim 10 wherein the pigment to binder weight ratio is about 1:1 to 4:1.

12. The composition of claim 11 containing at least 80% by weight non-volatiles in a solvent.

13. The composition of claim 12 wherein the solvent is an organic solvent.

* * * * *